US006842556B2

(12) United States Patent
Reznichenko

(10) Patent No.: US 6,842,556 B2
(45) Date of Patent: Jan. 11, 2005

(54) TWO INPUT, TWO OUTPUT OPTICAL SWITCH USING TWO MOVABLE MIRRORS

(75) Inventor: Yakov Reznichenko, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 133 days.

(21) Appl. No.: 10/238,264

(22) Filed: Sep. 10, 2002

(65) Prior Publication Data

US 2004/0047547 A1 Mar. 11, 2004

(51) Int. Cl.[7] ................................................. G02B 6/35
(52) U.S. Cl. ............................. 385/18; 385/47; 385/16; 359/212; 359/223
(58) Field of Search ............................. 385/18, 24, 34, 385/33, 17, 27, 25, 47, 31, 15, 16; 359/291, 295, 223, 224, 212, 214

(56) References Cited

U.S. PATENT DOCUMENTS

| 6,253,001 | B1 | * | 6/2001 | Hoen ........................... 385/17 |
| 6,337,760 | B1 | | 1/2002 | Huibers et al. ............. 359/291 |
| 6,347,167 | B1 | * | 2/2002 | Hagelin ........................ 385/18 |
| 6,429,976 | B1 | * | 8/2002 | Yamamoto et al. ......... 359/641 |
| 6,430,331 | B1 | * | 8/2002 | Hagelin et al. .............. 385/18 |
| 6,445,841 | B1 | * | 9/2002 | Gloeckner et al. ........... 385/17 |
| 6,525,864 | B1 | | 2/2003 | Gee et al. ................... 359/291 |
| 6,526,190 | B2 | | 2/2003 | Holzapfel et al. ............ 385/12 |
| 6,603,894 | B1 | | 8/2003 | Pu ............................... 385/18 |
| 6,625,345 | B2 | * | 9/2003 | Reznichenko ................ 385/18 |
| 6,633,694 | B2 | * | 10/2003 | Tew .............................. 385/18 |
| 6,671,082 | B2 | * | 12/2003 | Chen et al. .................. 385/18 |
| 6,690,885 | B1 | * | 2/2004 | Aksyuk et al. ............... 385/18 |
| 6,711,319 | B2 | * | 3/2004 | Hoen ........................... 385/18 |
| 6,731,833 | B2 | * | 5/2004 | Sandler et al. ............... 385/17 |
| 6,792,177 | B2 | * | 9/2004 | Welsh et al. ................. 385/18 |
| 2002/0076137 | A1 | * | 6/2002 | Anderson .................... 385/18 |
| 2002/0114556 | A1 | * | 8/2002 | Kato et al. ................... 385/47 |
| 2002/0159129 | A1 | * | 10/2002 | Islam et al. ................ 359/291 |
| 2002/0164109 | A1 | * | 11/2002 | Oikawa et al. .............. 385/17 |
| 2002/0191894 | A1 | | 12/2002 | Culver et al. ................ 385/16 |
| 2003/0002781 | A1 | | 1/2003 | Ford et al. ................... 385/18 |
| 2003/0002783 | A1 | | 1/2003 | Neilson et al. .............. 385/18 |
| 2003/0086146 | A1 | | 5/2003 | Meyers ...................... 359/291 |
| 2004/0165249 | A1 | * | 8/2004 | Aubuchon .................. 359/291 |

FOREIGN PATENT DOCUMENTS

| WO | WO 01/11410 A1 | 2/2001 | .......... G02B/26/02 |
| WO | WO 01/11419 A2 | 2/2001 | |
| WO | WO 01/71809 A1 | 9/2001 | |

* cited by examiner

*Primary Examiner*—Jared J. Fureman
(74) *Attorney, Agent, or Firm*—Bromberg & Sunstein LLP

(57) ABSTRACT

A two input, two output optical switch includes two movable mirrors. Each movable mirror is used for two optical signal reflections, one from an input fiber collimator to the same or a different movable mirror via a fixed cover mirror, and one from the same or a different movable mirror via the fixed cover mirror to an output fiber collimator. A single electrode may be used to control the mirror positions.

17 Claims, 7 Drawing Sheets

TWO INPUT, TWO OUTPUT OPTICAL SWITCH USING TWO MOVABLE MIRRORS

FIELD OF THE INVENTION

The present invention relates generally to optical networking, and more particularly to a two input, two output optical switch using two movable mirrors.

BACKGROUND OF THE INVENTION

Micromachined optical switches can be formed using micromachined movable mirrors that are controlled electronically, for example, through electrostatic forces. Such micromachined optical switches are a class of devices that are often referred to as Micro-Electromechanical Systems (MEMS). The movable mirrors and other micromachined components are typically etched from a wafer and deposited with various materials. For example, micromachined mirrors may be formed by depositing a diffusion barrier material, a reflective material, and an anti-static material on an etched mirror wafer. The movable mirrors are typically suspended from micromachined suspension springs. The mirror wafer is typically bonded to a substrate that includes electrostatic pads for controlling the mirror positions.

SUMMARY OF THE INVENTION

In accordance with one aspect of the invention, an optical switching apparatus switches optical signals between first and second optical inputs and first and second optical outputs. The optical switching apparatus includes a cover having at least a fixed mirror and a substrate having first and second movable mirrors. Each movable mirror has at least one axis of rotation for optical switching and is used to make at least two optical signal reflections involving the fixed mirror for switching optical signals between the first and second optical inputs and the first and second optical outputs. Each movable mirror is operably coupled to reflect an optical signal from an optical input to a movable mirror via the fixed mirror and to reflect an optical signal from a movable mirror via the fixed mirror to an optical output. The optical switching apparatus has a first switching configuration in which the first movable mirror is positioned to reflect an optical signal from the first optical input off of the fixed mirror back to the first movable mirror and on to the first optical output and the second movable mirror is positioned to reflect an optical signal from the second optical input off of the fixed mirror back to the second movable mirror and on to the second optical output. The optical switching apparatus has a second switching configuration in which the first movable mirror is positioned to reflect an optical signal from the first optical input off of the fixed mirror to the second movable mirror and on to the second optical output and the second movable mirror is positioned to reflect an optical signal from the second optical input off of the fixed mirror to the first movable mirror and on to the first optical output. The first movable mirror and the second movable mirror are substantially horizontal in the first switching configuration. The first movable mirror and the second movable mirror are tilted toward each other by substantially equal and opposite angles in the second switching configuration.

Each movable mirror comprises sufficient surface area to make the at least two optical signal reflections. Each movable mirror is typically an elongated mirror, such as an elliptical mirror, an oval mirror, or a rectangular mirror.

The first and second optical inputs and the first and second optical outputs may be integral to the cover or to the substrate.

The optical switching apparatus typically includes at least one lens for directing optical signals from the first and second optical inputs to the first and second movable mirrors. The at least one lens may be a wedge-shaped lens or a cylindrical lens.

The optical switching apparatus typically includes at least one lens for directing optical signals from the first and second movable mirrors to the first and second optical outputs. The at least one lens may be a wedge-shaped lens or a cylindrical lens.

A single electrode situated below and between the movable mirrors may be used to control the mirror positions.

DETAILED DESCRIPTION OF A PREFERRED EMBODIMENT

A micromachined N×N optical switch can be created using 2N movable mirrors, where N is the number of input/output pairs for the switch. Thus, a 2×2 optical switch having two inputs and two outputs includes four movable optical mirrors (i.e., N=2), a 3×3 optical switch having three inputs and three outputs includes six movable mirrors (i.e., N=3), and so on. For convenience, such an optical switch is referred to hereinafter as a 2N optical switch.

Figure 1:
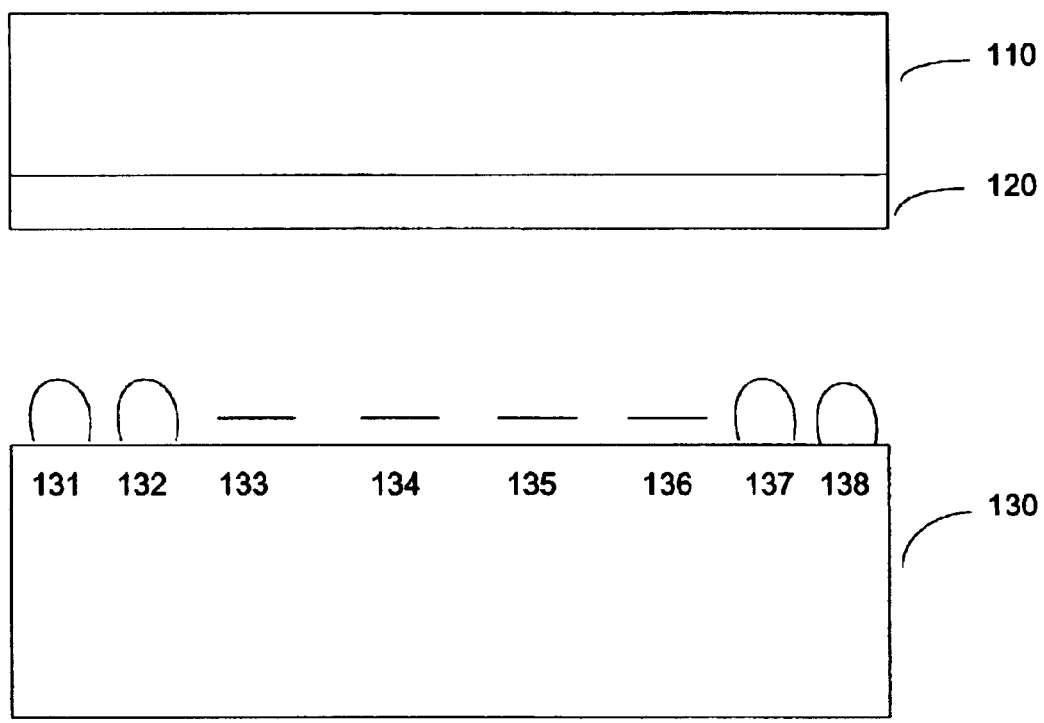
FIG. 1 shows an exemplary 2×2 optical switch that uses four movable mirrors that are arranged linearly to switch optical signals between two inputs in accordance with a 2N optical switching architecture.

FIG. 1 shows an exemplary 2×2 optical switch 100 that uses four movable mirrors that are arranged linearly to switch optical signals between two inputs and two outputs. Specifically, the optical switch 100 includes a cover having a fixed mirror surface 120 and a substrate 130 having two input fiber collimators 131 and 132, a first pair of movable mirrors 133 and 134, and second pair of movable mirrors 135 and 136, and two output fiber collimators 137 and 138. A front view of the optical switch 100 is shown.

The optical fiber collimators 131 and 132 are configured so as to direct optical signals via the fixed mirror 120 to the movable mirrors 133 and 134, respectively. The optical fiber collimators 137 and 138 are configured so as to receive optical signals via the fixed mirror 120 from the movable mirrors 135 and 136, respectively. By controlling the positions of the movable mirrors, optical signals can be switched between the input fiber collimators 131 and 132 and the output fiber collimators 137 and 138.

The optical switch 100 essentially has two switching configurations.

In one switching configuration, the optical signal from input fiber collimator 131 is switched to output fiber collimator 137, and the optical signal from input fiber collimator 132 is switched to output fiber collimator 138. In order to switch the optical signal from input fiber collimator 131 to output fiber collimator 137, movable mirror 133 is positioned so as to direct the optical signal from input fiber collimator 131 to movable mirror 135 via the fixed mirror 120, and movable mirror 135 is positioned so as to direct the optical signal from movable mirror 133 to output fiber collimator 137 via the fixed mirror 120. In order to switch the optical signal from input fiber collimator 132 to output fiber collimator 138, movable mirror 134 is positioned so as to direct the optical signal from input fiber collimator 132 to movable mirror 136 via the fixed mirror 120, and movable mirror 136 is positioned so as to direct the optical signal from movable mirror 134 to output fiber collimator 138 via the fixed mirror 120.

In the other switching configuration, the optical signal from input fiber collimator 131 is switched to output fiber collimator 138, and the optical signal from input fiber collimator 132 is switched to output fiber collimator 137. In order to switch the optical signal from input fiber collimator 131 to output fiber collimator 138, movable mirror 133 is positioned so as to direct the optical signal from input fiber collimator 131 to movable mirror 136 via the fixed mirror 120, and movable mirror 136 is positioned so as to direct the optical signal from movable mirror 133 to output fiber collimator 138 via the fixed mirror 120. In order to switch the optical signal from input fiber collimator 132 to output fiber collimator 137, movable mirror 134 is positioned so as to direct the optical signal from input fiber collimator 132 to movable mirror 135 via the fixed mirror 120, and movable mirror 135 is positioned so as to direct the optical signal from movable mirror 134 to output fiber collimator 137 via the fixed mirror 120.

Figure 2:
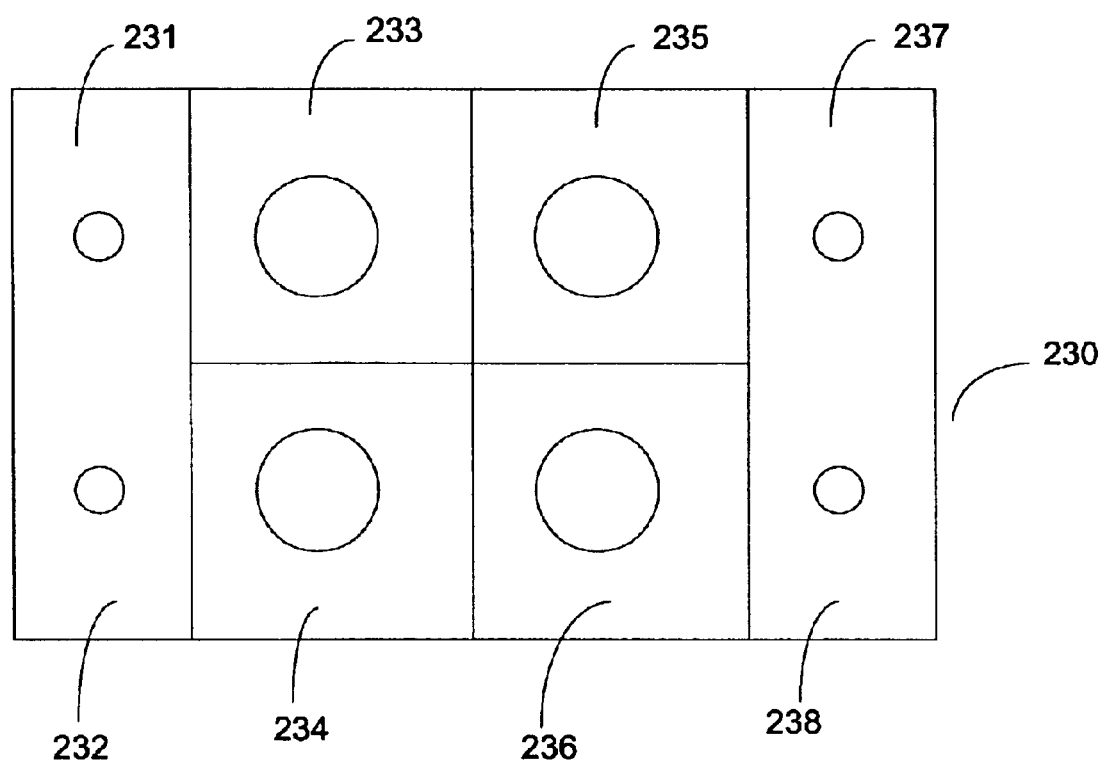
FIG. 2 shows an exemplary 2×2 optical switch that uses four movable mirrors that are arranged in two side-by-side pairs to switch optical signals between two inputs and two outputs in accordance with a 2N optical switching architecture.

FIG. 2 shows an exemplary 2×2 optical switch 200 that uses four movable mirrors that are arranged in two side-by-side pairs to switch optical signals between two inputs and two outputs. The optical switch 200 includes a cover having a fixed mirror surface (not shown) and a substrate 230 having input fiber collimators 231 and 232, a first pair of movable mirrors 233 and 234, a second pair of movable mirrors 235 and 236, and two output fiber collimators 237 and 238. A top view of the substrate 230 is shown.

The optical fiber collimators 231 and 232 are configured so as to direct optical signals via the fixed cover mirror to the movable mirrors 233 and 234, respectively. The optical fiber collimators 237 and 238 are configured so as to receive optical signals via the fixed cover mirror from the movable mirrors 235 and 236, respectively. By controlling the positions of the movable mirrors, optical signals can be switched between the input fiber collimators 231 and 232 and the output fiber collimators 237 and 238.

The optical switch 200 essentially has two switching configurations.

In one switching configuration, the optical signal from input fiber collimator 231 is switched to output fiber collimator 237, and the optical signal from input fiber collimator 232 is switched to output fiber collimator 238. In order to switch the optical signal from input fiber collimator 231 to output fiber collimator 237, movable mirror 233 is positioned so as to direct the optical signal from input fiber collimator 231 to movable mirror 235 via the fixed cover mirror, and movable mirror 235 is positioned so as to direct the optical signal from movable mirror 233 to output fiber collimator 237 via the fixed cover mirror. In order to switch the optical signal from input fiber collimator 232 to output fiber collimator 238, movable mirror 234 is positioned so as to direct the optical signal from input fiber collimator 232 to movable mirror 236 via the fixed cover mirror, and movable mirror 236 is positioned so as to direct the optical signal from movable mirror 234 to output fiber collimator 238 via the fixed cover mirror.

In the other switching configuration, the optical signal from input fiber collimator 231 is switched to output fiber collimator 238, and the optical signal from input fiber collimator 232 is switched to output fiber collimator 237. In order to switch the optical signal from input fiber collimator 231 to output fiber collimator 238, movable mirror 233 is positioned so as to direct the optical signal from input fiber collimator 231 to movable mirror 236 via the fixed cover mirror, and movable mirror 236 is positioned so as to direct the optical signal from movable mirror 233 to output fiber collimator 238 via the fixed cover mirror. In order to switch the optical signal from input fiber collimator 232 to output fiber collimator 237, movable mirror 234 is positioned so as to direct the optical signal from input fiber collimator 232 to movable mirror 235 via the fixed cover mirror, and movable mirror 235 is positioned so as to direct the optical signal from movable mirror 234 to output fiber collimator 237 via the fixed cover mirror.

It should be noted that the optical switch 200 can be fabricated so that the movable mirror do not need to be tilted (i.e., they can positioned horizontally) when switching optical signals straight through from input fiber collimator 231 to output fiber collimator 237 and from input fiber collimator 232 to output fiber collimator 238, and only need to be tilted when "cross-connect" switching optical signals from input fiber collimator 231 to output fiber collimator 238 and from input fiber collimator 232 to output fiber collimator 237.

It should be noted that optical switches similar to the optical switches 100 and 200 can be formed with the fiber collimators incorporated into the cover rather than the substrate. In such optical switch configurations, optical signals from the input fiber collimators in the cover are directed to the first set of movable mirrors on the substrate, and optical signals from the second set of movable mirrors on the substrate are directed to the output fiber collimators in the cover. Such optical switches operate generally as described above. Specifically, an optical signal is directed from one mirror of the first set of movable mirrors to one mirror of the second set of movable mirrors via the fixed cover mirror.

In an embodiment of the present invention, a two input, two output optical switch includes two movable mirrors. For convenience, such an optical switch is referred to hereinafter as a 1N optical switch, where the number of movable mirrors is equal to the number of input/output pairs.

One advantage of such a 1N optical switch is that it requires half the number of movable mirrors compared to a 2N optical switch. Among other things, this can help reduce the cost and complexity of the optical switch.

In a 1N optical switch of the present invention, each movable mirror is used for two optical signal reflections, one from an input fiber collimator to the same or a different movable mirror via a fixed cover mirror, and one from the same or a different movable mirror via the fixed cover mirror to an output fiber collimator. In order for the movable mirrors to make two optical signal reflections, each movable mirror must have a sufficient surface area to allow it to make the necessary reflections depending on such things as the angle from the input fiber collimators to the movable mirrors, the distance between the movable mirrors and the fixed cover mirror, the angle to the output fiber collimators, and the distance between adjacent movable mirrors. In order for each movable mirror to have sufficient surface area to make the multiple reflections and keep the optical switch roughly the same size as a 2N optical switch, the movable mirrors are typically elongated (e.g., having two major dimensions such as length and width, where one dimension is larger than the other dimension), preferably into an elliptical shape, although the present invention is in no way limited to elongated and/or elliptical mirrors.

Each of the movable mirrors typically has an axis of rotation allowing it to be tilted toward one or more other adjacent movable mirrors for optical switching purposes, and may have an axis of rotation perpendicular thereto for alignment purposes. Thus, elliptical mirrors typically have an axis of rotation about its longer dimension for optical switching purposes, and may have an axis of rotation about its shorter dimension for alignment purposes.

An exemplary 2×2 optical switched is essentially a variation of the optical switch 200 in which movable mirrors 233 and 235 are combined into a single elliptical mirror and movable mirrors 234 and 236 are combined into a single elliptical mirror. Each movable mirror is used for two optical signal reflections, one from an input fiber collimator to the same or a different movable mirror via a fixed cover mirror, and one from the same or a different movable mirror via the fixed cover mirror to an output fiber collimator. When positioned horizontally, the movable mirrors switch optical signals straight through from each input fiber collimator to the output fiber collimator on the same side of the switch. When tilted toward one another, the movable mirrors "cross-connect" switch optical signals from each input fiber collimator to the output fiber collimator on the opposite side of the switch.

Figure 3:
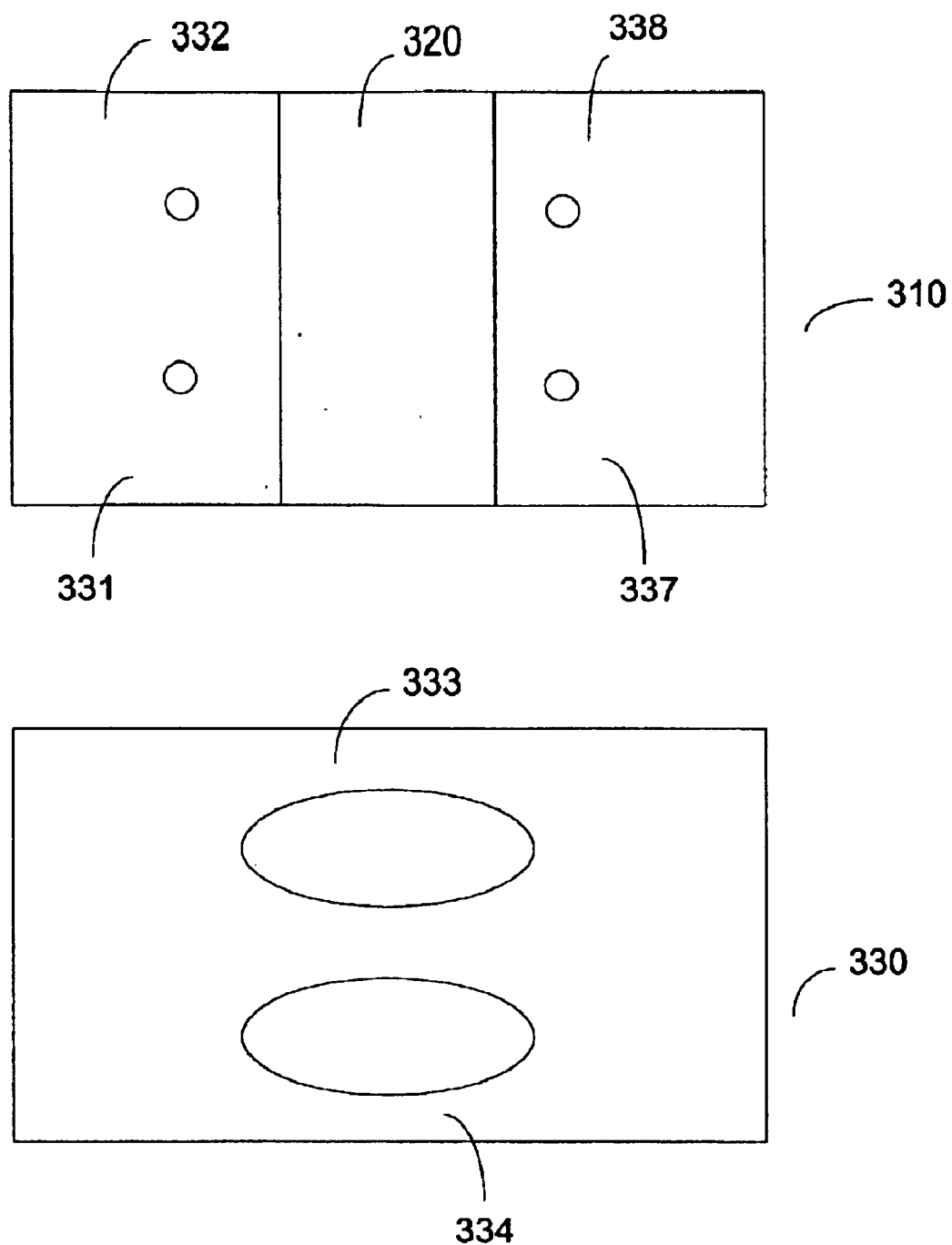
FIG. 3 shows an exemplary 2×2 optical switch in accordance with an embodiment of the present invention.

FIG. 3 shows an exemplary 2×2 optical switch 300 in accordance with an embodiment of the present invention. The optical switch 300 includes a cover 310 having two input fiber collimators 331 and 332, a fixed mirror 320, and two output fiber collimators 337 and 338. A bottom view of the cover 310 is shown. The optical switch 300 also includes a substrate 330 having two elliptical movable mirrors 333 and 334. A top view of the substrate 330 is shown.

The optical fiber collimators 331 and 332 are configured so as to direct optical signals to the movable mirrors 333 and 334, respectively. The optical fiber collimators 337 and 338 are configured so as to receive optical signals from the movable mirrors 333 and 334, respectively. By controlling the positions of the movable mirrors, optical signals can be switched between the input fiber collimators 331 and 332 and the output fiber collimators 337 and 338.

The optical switch 300 essentially has two switching configurations.

In one switching configuration, the optical signal from input fiber collimator 331 is switched to output fiber collimator 337, and the optical signal from input fiber collimator 332 is switched to output fiber collimator 338. In order to switch the optical signal from input fiber collimator 331 to output fiber collimator 337, movable mirror 333 is positioned so that the optical signal from input fiber collimator 331 is reflected from movable mirror 333 off of the fixed mirror 320 back to the movable mirror 333 and on to the output fiber collimator 337. In order to switch the optical signal from input fiber collimator 332 to output fiber collimator 338, movable mirror 334 is positioned so that the optical signal from input fiber collimator 332 is reflected from movable mirror 334 off of the fixed mirror 320 back to the movable mirror 334 and on to the output fiber collimator 338. The various components of the optical switch 300 are typically positioned so that these switching operations can be accomplished with the movable mirrors 333 and 334 in the horizontal position (i.e., not tilted along the longer axis of rotation).

Figure 4:
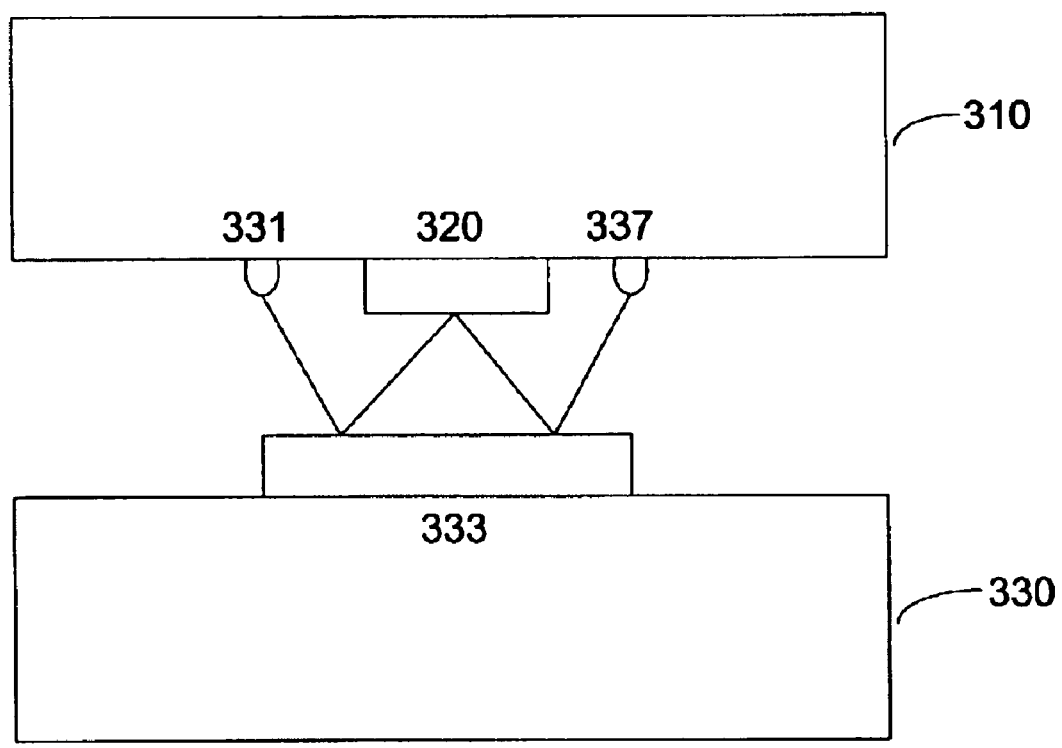
FIG. 4 shows the optical signal path for switching the optical signal from the input fiber collimator 331 to the output fiber collimator 337 in the optical switch shown in FIG. 3.

FIG. 4 shows the optical signal path for switching the optical signal from the input fiber collimator 331 to the output fiber collimator 337 in the optical switch 300 in accordance with an embodiment of the present invention. A side view of the optical switch 300 along the longer axis of the movable mirror 333 is shown. In this case, the movable mirror 333 is positioned horizontally (i.e., not tilted toward movable mirror 334). The optical signal from input fiber collimator 331 is directed to movable mirror 333, which reflects the optical signal off of the fixed mirror 320 back to the movable mirror 333 and on to the output fiber collimator 337.

In the other switching configuration, the optical signal from input fiber collimator 331 is switched to output fiber collimator 338, and the optical signal from input fiber collimator 332 is switched to output fiber collimator 337. This involves tilting both movable mirrors 333 and 334 toward each other by substantially equal but opposite angles along their longer axes of rotation so that the optical signal from input fiber collimator 331 is reflected from movable mirror 333 off of the fixed mirror 320 to the movable mirror 334 and on to the output fiber collimator 338 and the optical signal from input fiber collimator 332 is reflected from movable mirror 334 off of the fixed mirror 320 to the movable mirror 333 and on to the output fiber collimator 337.

Figure 5:
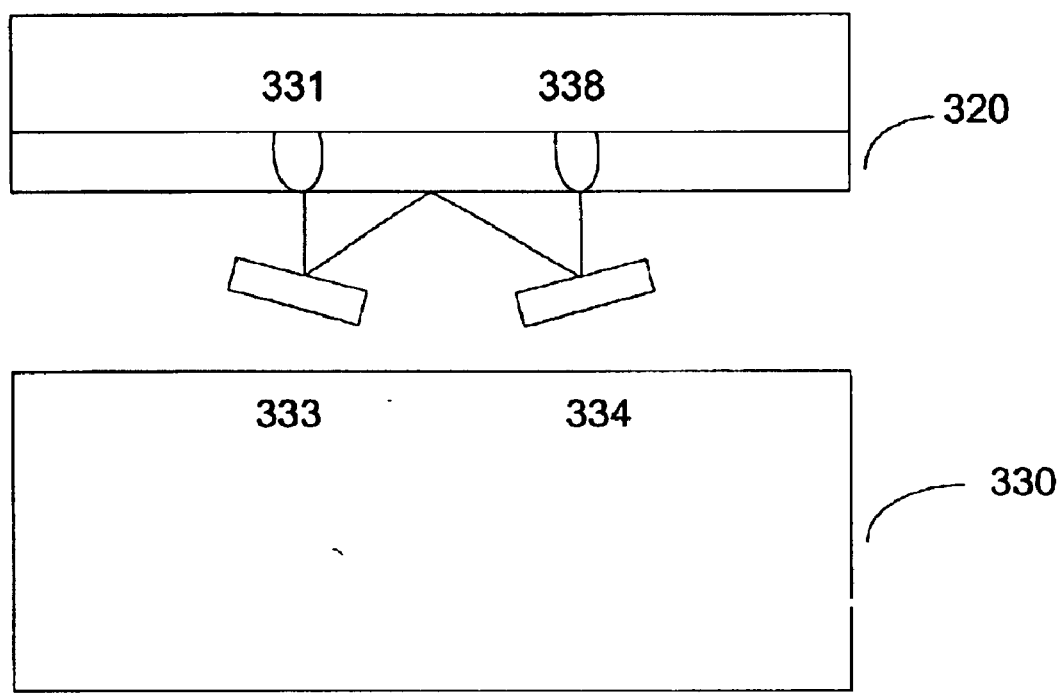
FIG. 5 shows the optical signal path for switching the optical signal from the input fiber collimator 331 to the output fiber collimator 338 in the optical switch shown in FIG. 3.

FIG. 5 shows the optical signal path for switching the optical signal from the input fiber collimator 331 to the output fiber collimator 338 in the optical switch 300 in accordance with an embodiment of the present invention. A side view of the optical switch 300 along the shorter axis of the movable mirrors 333 and 334 is shown. In this case, the movable mirrors 333 and 334 are tiled toward each other. The optical signal from input fiber collimator 331 is directed to movable mirror 333, which reflects the optical signal off of the fixed mirror 320 to the movable mirror 334 and on to the output fiber collimator 338.

In order to direct optical signals to and from the optical fiber collimators, the cover typically incorporates one or more lenses. The lenses are not limited to any particular shape, although the lenses are typically wedge or cylindrical shaped. The lenses direct incoming optical signals from the input fiber collimators to the movable mirrors at a proper angle and direct outgoing optical signals from the movable mirrors to the output fiber collimators at a proper angle.

Figure 6:
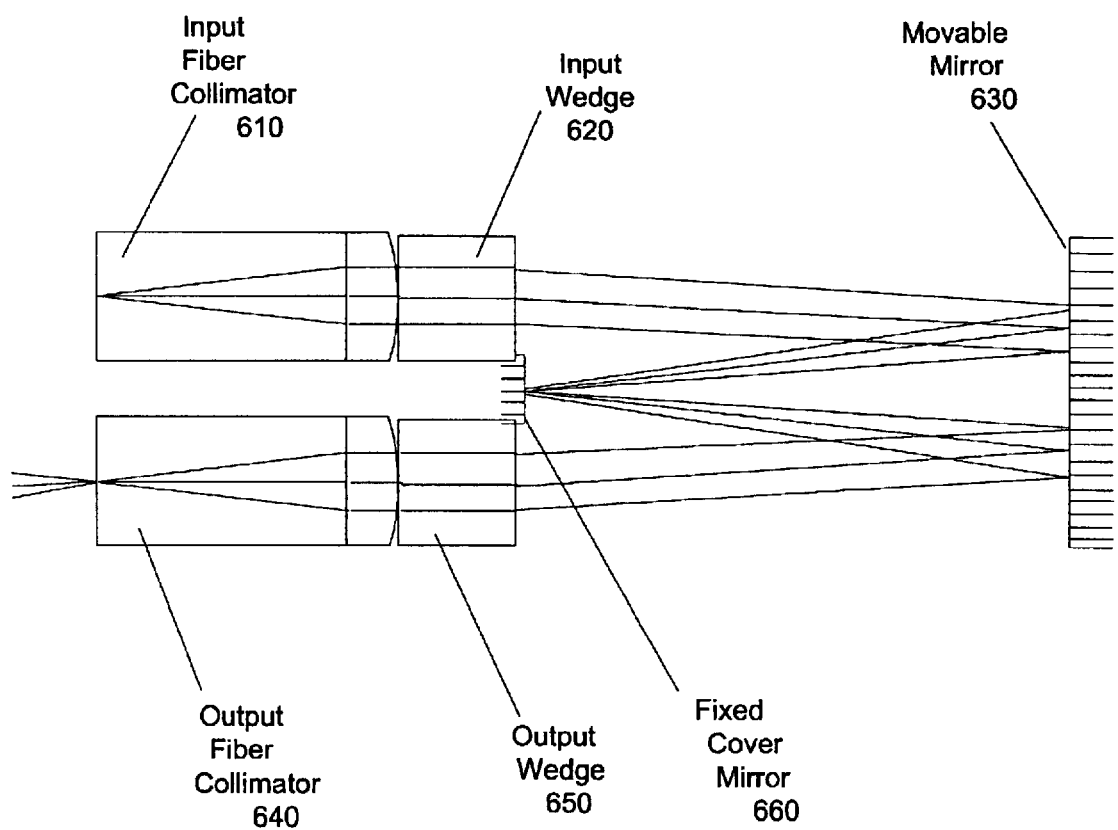
FIG. 6 shows a double wedge cover configuration in accordance with an embodiment of the present invention.

FIG. 6 shows a double wedge cover configuration 600 in accordance with an embodiment of the present invention. An input wedge 620 directs incoming optical signals from the input fiber collimator 610 to the movable mirror 630 at a proper angle. An output wedge 650 directs outgoing optical signals from the movable mirror 630 to the output fiber collimator 640 at a proper angle. The fixed cover mirror 660 is positioned between the two wedges 620 and 650.

In one particular embodiment of the optical switch 300, the movable mirrors 333 and 334 are approximately 0.5×1 millimeter and may have a single axis of rotation along the 1 millimeter axis or a double axis of rotation for alignment purposes. The distance between the fixed mirror 320 and the movable mirrors 333 and 334 is approximately 5 millimeters. The angle of rotation of the movable mirrors 333 and 334 is approximately 2.5 degrees for cross-connect switching. The wedge angle is approximately 5 degrees.

As described above, the optical switch 300 essentially has two switching configurations, one in which the movable mirrors are positioned horizontally and another in which the movable mirrors are tilted toward each other by substantially equal but opposite angles. In one particular embodiment of the invention, mirror positioning is accomplished using a single electrode that is situated under and between the two movable mirrors. When no voltage is applied to the electrode, the movable mirrors sit in the horizontal position. When a voltage is applied to the electrode, the edges of the movable mirrors closest to the electrode are pulled downward toward the electrode so that the movable mirrors tilt toward each other at substantially equal but opposite angles.

Figure 7:
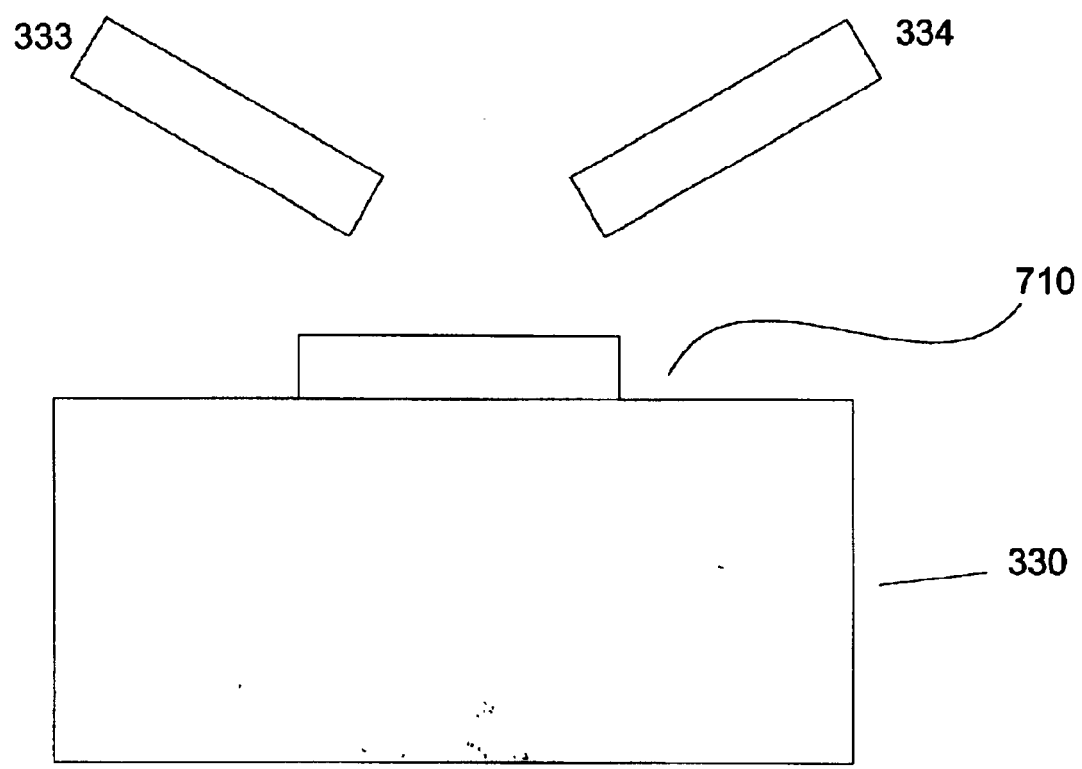
FIG. 7 shows an exemplary optical switch having a single electrode situated below and between the two movable mirrors and in accordance with an embodiment of the present invention

FIG. 7 shows an exemplary optical switch 700 having a single electrode 710 situated below and between the two movable mirrors 333 and 334 in accordance with an embodiment of the present invention. The single electrode is typically formed on the substrate 330. When no voltage is applied to the electrode 710, the movable mirrors 333 and 334 sit in the horizontal position. When a voltage is applied to the electrode 710, the edges of the movable mirrors 333 and 334 closest to the electrode are pulled downward toward the electrode so that the movable mirrors 333 and 334 tilt toward each other at substantially equal but opposite angles. The movable mirrors 333 and 334 are shown in the tilted positions such as when a sufficient voltage is applied to the electrode 710.

It should be noted that an optical switch similar to the optical switch 300 and 200 can be formed with the fiber collimators incorporated into the substrate rather than the cover. In such optical switch configurations, optical signals from the input fiber collimators in the substrate are directed to the movable mirrors on the substrate via a fixed cover mirror, and optical signals from the movable mirrors on the substrate are directed to the output fiber collimators in the substrate via a fixed cover mirror. Such optical switches operate generally as described above.

It should be noted that the present invention is in no way limited to any particular shape of movable mirrors. The movable mirrors can be any shape, including round and elongated, so long as they have sufficient surface area to make the multiple reflections necessary for optical switching. The use of elongated mirrors may have certain advantages including, cost, size, complexity, and angle of rotation advantages. For example, a large round mirror having sufficient surface area would generally take up more chip space, require higher control voltages, and require larger angles of rotation compared to an elongated mirror having its major dimension equal to the diameter of the large round mirror. When elongated mirrors are used, the elongated mirrors can be any of a variety of shapes, including, but in no way limited to, elliptical, oval, and rectangular shapes.

The present invention may be embodied in other specific forms without departing from the true scope of the invention. The described embodiments are to be considered in all respects only as illustrative and not restrictive.

What is claimed is:

1. An optical switching apparatus for switching optical signals between two optical inputs and two optical outputs, the optical switching apparatus comprising:
    a first input optical fiber collimator and a second input optical fiber collimator;
    a first output optical fiber collimator and a second output optical fiber collimator;
    a cover having at least a fixed mirror; and
    a substrate having a first movable mirror and a second movable mirror, wherein each movable mirror has at least one axis of rotation for optical switching, and wherein each movable mirror is operably coupled to make at least two optical signal reflections involving the fixed mirror for switching optical signals between the first and second optical inputs and the first and second optical outputs.

2. The optical switching apparatus of claim 1, wherein each movable mirror is operably coupled to reflect an optical signal from an input optical fiber collimator to a movable mirror via the fixed mirror and to reflect an optical signal from a movable mirror via the fixed mirror to an output optical fiber collimator.

3. The optical switching apparatus of claim 2, comprising:
    a first switching configuration in which the first movable mirror is positioned to reflect an optical signal from the first input optical fiber collimator off of the fixed mirror back to the first movable mirror and on to the first output optical fiber collimator and the second movable mirror is positioned to reflect an optical signal from the second input optical fiber collimator off of the fixed mirror back to the second movable mirror and on to the second output optical fiber collimator; and
    a second switching configuration in which the first movable mirror is positioned to reflect an optical signal from the first input optical fiber collimator off of the fixed mirror to the second movable mirror and onto the second output optical fiber collimator and the second movable mirror is positioned to reflect an optical signal from the second input optical fiber collimator off of the fixed mirror to the first movable mirror and on to the first output optical fiber collimator.

4. The optical switching apparatus of claim 3, wherein the first movable mirror and the second movable mirror are substantially horizontal in the first switching configuration.

5. The optical switching apparatus of claim 3, wherein the first movable mirror and the second movable mirror are tilted toward each other by substantially equal and opposite angles in the second switching configuration.

6. The optical switching apparatus of claim 1, wherein each movable mirror comprises sufficient surface area to make the at least two optical signal reflections.

7. The optical switching apparatus of claim 6, wherein each movable mirror comprises an elongated mirror.

8. The optical switching apparatus of claim of claim 7, wherein an elongated mirror comprises one of:
    an elliptical mirror;
    an oval mirror; and
    a rectangular mirror.

9. The optical switching apparatus of claim 1, wherein the first and second input optical fiber collimators and the first and second output optical fiber collimators are integral to the cover.

10. The optical switching apparatus of claim 1, wherein the first and second input optical fiber collimators and the first and second output optical fiber collimators are integral to the substrate.

11. The optical switching apparatus of claim 1, further comprising:
    at least one lens for directing optical signals from the first and second input optical fiber collimators to the first and second movable mirrors.

12. The optical switching apparatus of claim 11, wherein the at least one lens comprises at least one of:
    a wedge-shaped lens; and
    a cylindrical lens.

13. The optical switching apparatus of claim 1, further comprising:
    at least one lens for directing optical signals from the first and second movable mirrors to the first and second output optical fiber collimators.

14. The optical switching apparatus of claim 13, wherein the at least one lens comprises at least one of:
    a wedge-shaped lens; and
    a cylindrical lens.

15. The optical switching apparatus of claim 1, wherein the substrate further comprises:
    a single electrode positioned below and between the movable mirrors for controlling the mirror positions.

16. The optical switching apparatus of claim 15, wherein the first movable mirror and the second movable mirror are substantially horizontal when no voltage is applied to the electrode.

17. The optical switching apparatus of claim 15, wherein the first movable mirror and the second movable mirror are tilted toward each other by substantially equal and opposite angles when a predetermined voltage is applied to the electrode.

* * * * *